US011622553B1

(12) United States Patent
Draeger (10) Patent No.: US 11,622,553 B1
(45) Date of Patent: *Apr. 11, 2023

(54) ROTATING HEAD OWL WITH TWO-PIECE HEAD

(71) Applicant: Dalen Products, Inc., Knoxville, TN (US)

(72) Inventor: William M. Draeger, Sevierville, TN (US)

(73) Assignee: Dalen Products, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,010

(22) Filed: Mar. 2, 2022

Related U.S. Application Data (63) Continuation of application No. 16/445,714, filed on Jun. 19, 2019, now Pat. No. 11,311,007.

(51) Int. Cl.
*A01M 29/06* (2011.01)
*F16C 11/04* (2006.01)

(52) U.S. Cl.
CPC ............. *A01M 29/06* (2013.01); *F16C 11/04* (2013.01)

(58) Field of Classification Search
CPC ...... A01M 29/06; A01M 31/06; A01M 29/00; A01M 29/34; F16C 11/04; A63H 11/00
USPC .......................................................... 43/1, 2, 3
See application file for complete search history.

(56) References Cited

U.S. PATENT DOCUMENTS

2008/0210153 A1* 9/2008 Alvarado .............. A01M 29/06
340/573.2

* cited by examiner

*Primary Examiner* — Joshua J Michener
*Assistant Examiner* — Nicole Paige MacCrate
(74) *Attorney, Agent, or Firm* — Luedeka Neely Group, PC (57) ABSTRACT

A scarecrow includes a scarecrow body corresponding generally in shape to a body of a live animal; and an assembled and balanced hollow head of molded plastic construction corresponding in shape to a head of the live animal. The assembled and balanced head includes a front face portion and a rear head portion fixed together to form the head. The front face portion has a first thickness and the rear head portion has a second thickness, the front face portion and the rear head portion being unequal in weight, with the rear head portion having selected areas on an interior surface thereof that are thicker than the first thickness and define an offset weight so that the assembled head is substantially balanced as assembled. An unstable mount is disposed between the body and the head onto which the head is rotatably mounted for 360-degree movement of the head to the body without interfering with free movement of the head, the head being balanced on the unstable mount.

15 Claims, 11 Drawing Sheets

ROTATING HEAD OWL WITH TWO-PIECE HEAD

FIELD

This disclosure relates to the field of scarecrows and particularly plastic owls having movable heads. More particularly, the disclosure relates to head and head support structures for scarecrow devices that simplifies assembly.

BACKGROUND

Improvement is desired in the structure and assembly of scarecrow devices and the like of the type having a head that moves or rotates relative to a body.

Successful designs utilized commercially in owl scarecrows utilize a head that is movably mounted to an owl body by an unstable mount. One design utilizes wind currents and the like to move the head relative to the body and another design has intermittent powered movement, such owls being available from Dalen Products, Inc. of Knoxville, Tennessee, and described in U.S. Pat. Nos. 5,901,491; 8,171,875; and 7,966,963 all assigned to Dalen Products, Inc.

While the designs of such owl devices provide a desired appearance of the owl and movement of the head, the assembly of the devices requires skill and is time consuming. The present disclosure advantageously provides improved structures for the head and the unstable mount that provide advantages over the prior structures and simplify assembly, and result in other product improvements.

SUMMARY

The above and other needs are met by a scarecrow having a rotating head with the head being of two-piece construction.

In one aspect, a scarecrow according to the disclosure includes a body corresponding generally in shape to a scarecrow body of a live animal; and an assembled and balanced hollow head of molded plastic construction corresponding in shape to a head of the live animal. The assembled and balanced head includes a front face portion and a rear head portion fixed together to form the head. The front face portion has a first thickness and the rear head portion has a second thickness, the front face portion and the rear head portion being unequal in weight, with the rear head portion having selected areas on an interior surface thereof that are thicker than the first thickness and define an offset weight so that the assembled head is substantially balanced as assembled. An unstable mount is disposed between the body and the head onto which the head is rotatably mounted for 360-degree movement of the head to the body without interfering with free movement of the head, the head being balanced on the unstable mount.

In another aspect, a scarecrow according to the disclosure includes a scarecrow body corresponding generally in shape to a scarecrow body of a live animal; and an assembled and balanced hollow head of molded plastic construction corresponding in shape to a head of the live animal. The assembled and balanced head includes a front face portion and a rear head portion press-fit together. The front face portion has a first thickness and the rear head portion has a second thickness. The front face portion and the rear head portion are unequal in weight, with the rear head portion having selected areas on an interior surface thereof that are thicker than the first thickness and define an offset weight. The front face portion includes a mouth receiver and eye receivers, a mouth having a weight and installed into the mouth receiver and eyes each having a weight and installed into the eye receivers. The offset weights of the thickened areas substantially correspond to the weights of the mouth and the eyes. An unstable mount is disposed between the body and the head onto which the head is rotatably mounted for 360-degree movement of the head to the body without interfering with free movement of the head, the head being balanced on the unstable mount.

In another aspect, the disclosure provides a method of assembling a scarecrow, including the steps of: providing a scarecrow body corresponding generally in shape to a body of a live animal; providing a front face portion and a rear head portion of a scarecrow head, the front face portion and the rear head portion being unequal in weight, with the rear head portion having selected areas on an interior surface thereof that are thicker than the first thickness and define an offset weight; providing an unstable mount comprising a lower pivot assembly and an upper pivot assembly; installing the lower pivot assembly onto the scarecrow body; installing the upper pivot assembly onto the rear head portion; fitting together the front face portion and the rear head portion to provide an assembled scarecrow head that is substantially balanced as assembled, with the upper pivot assembly extending out of a lower portion of the assembled scarecrow head; and installing the upper pivot assembly with the assembled scarecrow head onto the lower pivot assembly, wherein the scarecrow head is balanced on the unstable mount.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
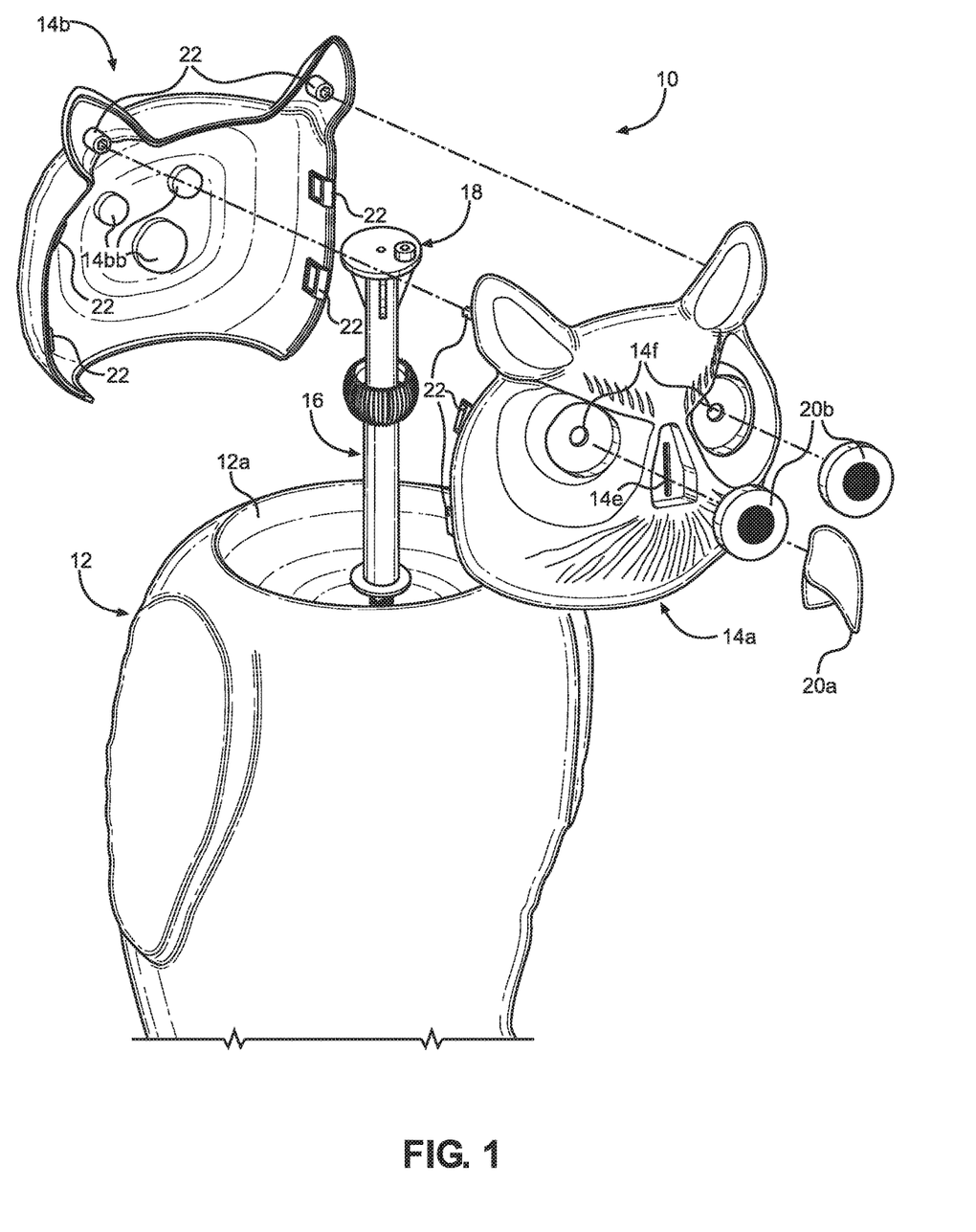
FIG. 1 is an exploded perspective view of a rotating head owl according to the disclosure.
Figure 2:
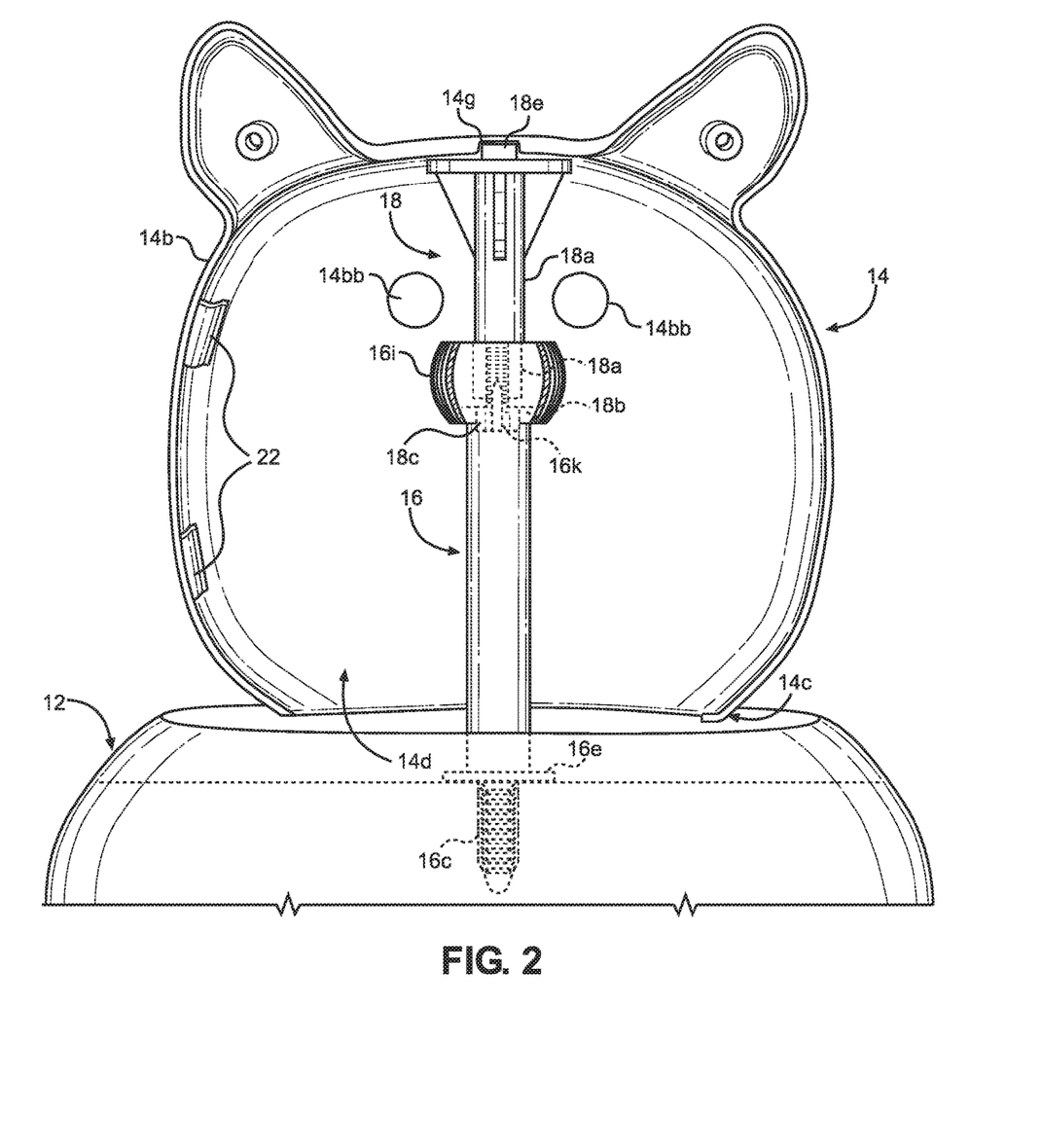
FIG. 2 is a closeup view showing mounting of a head of the owl of FIG. 1 to an unstable mount.
Figure 3:
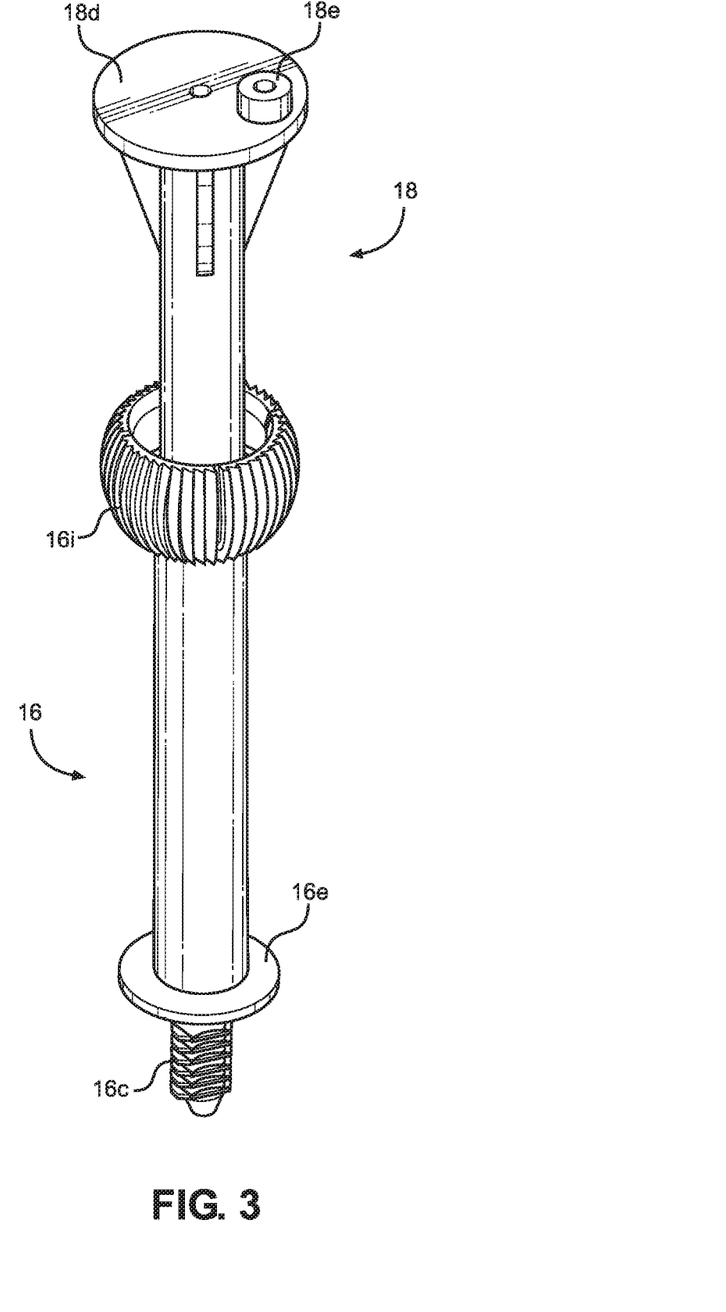
FIGS. 3-7 show the unstable mount of the owl of FIG. 1.
Figure 4:
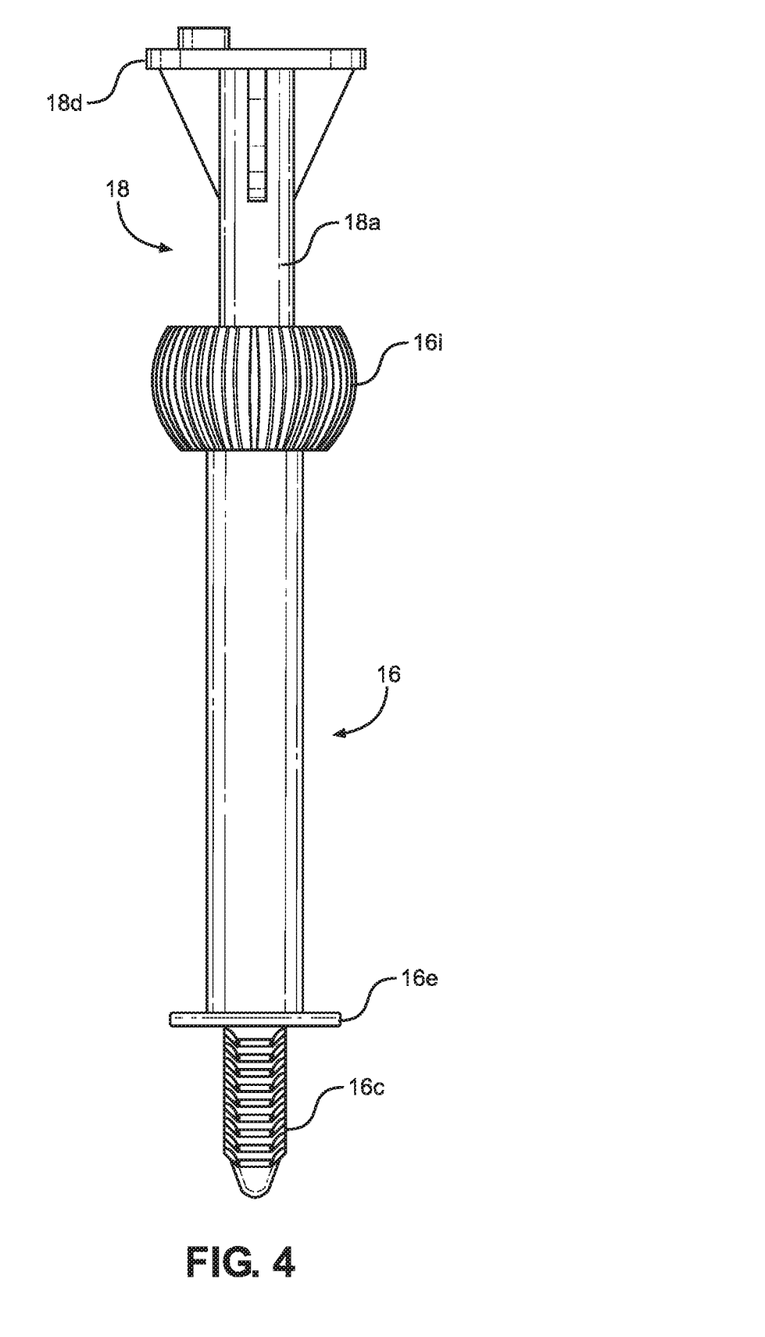
Figure 5:
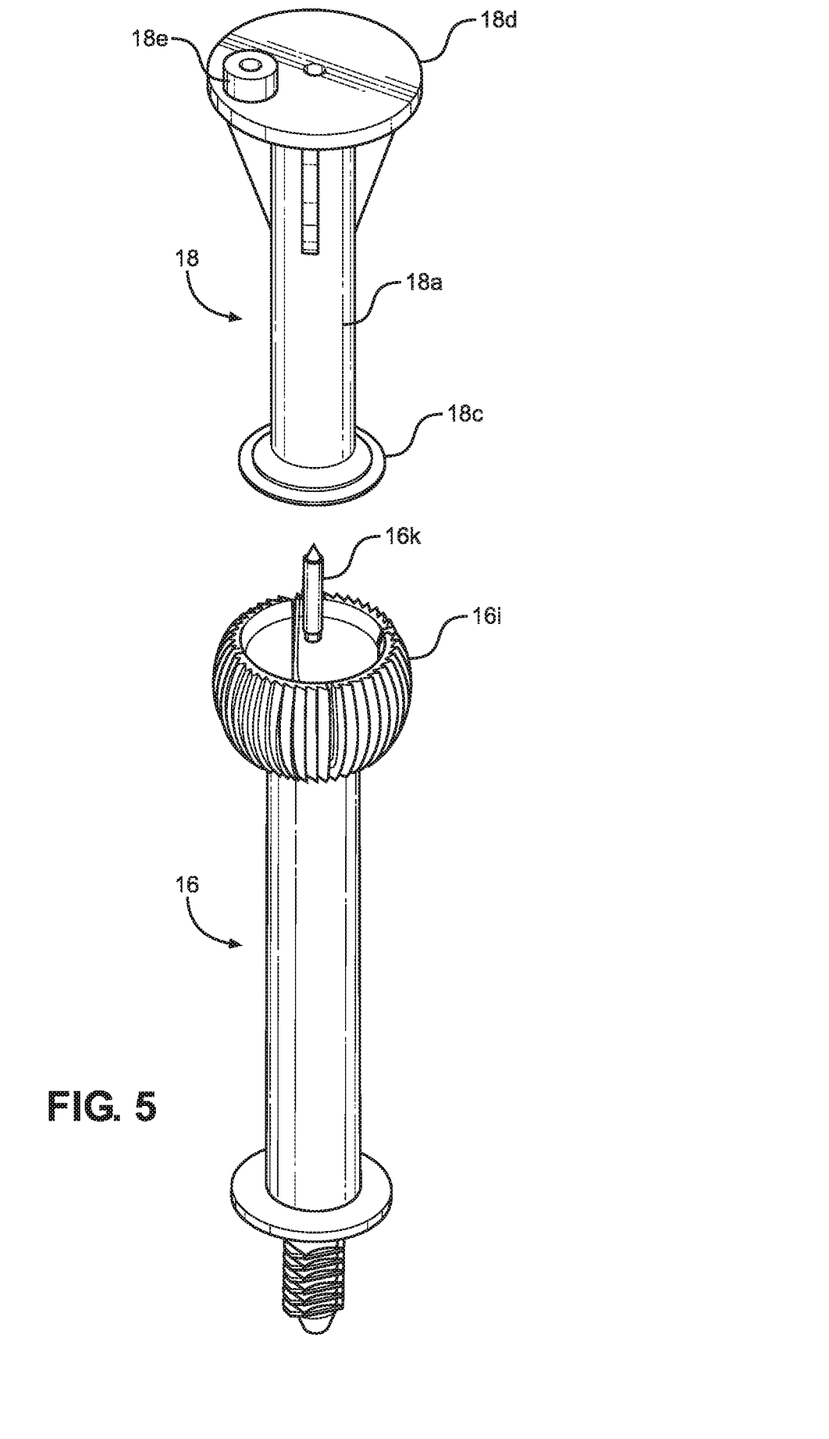
Figure 6:
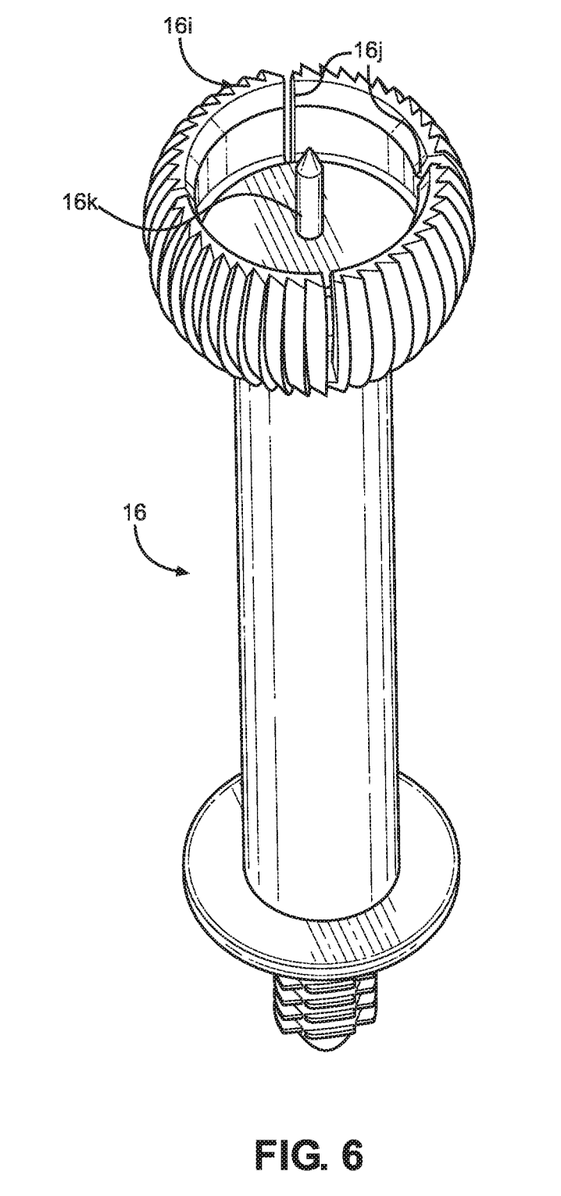
Figure 7:
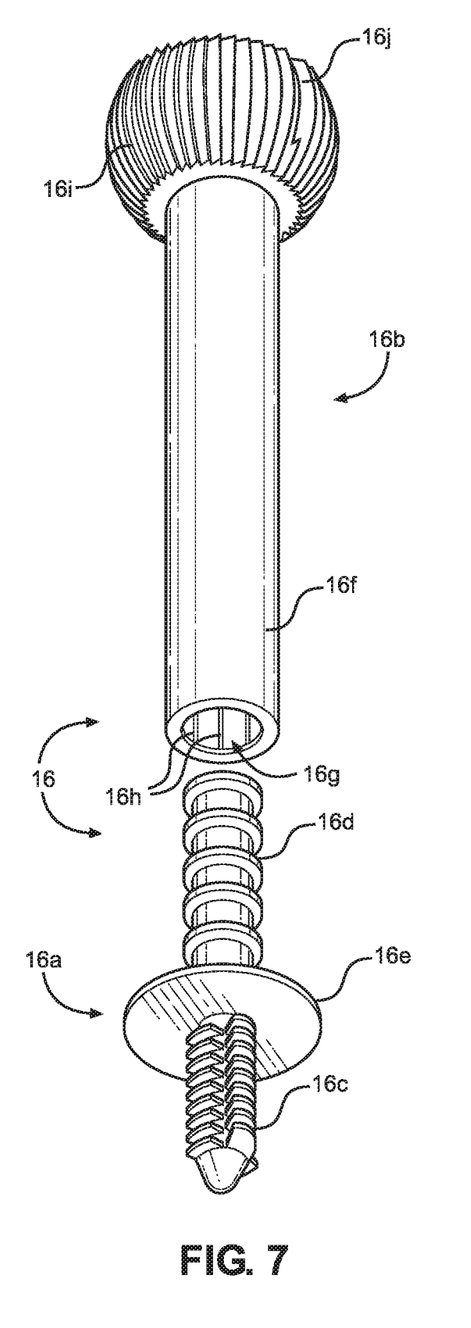
Figure 8:
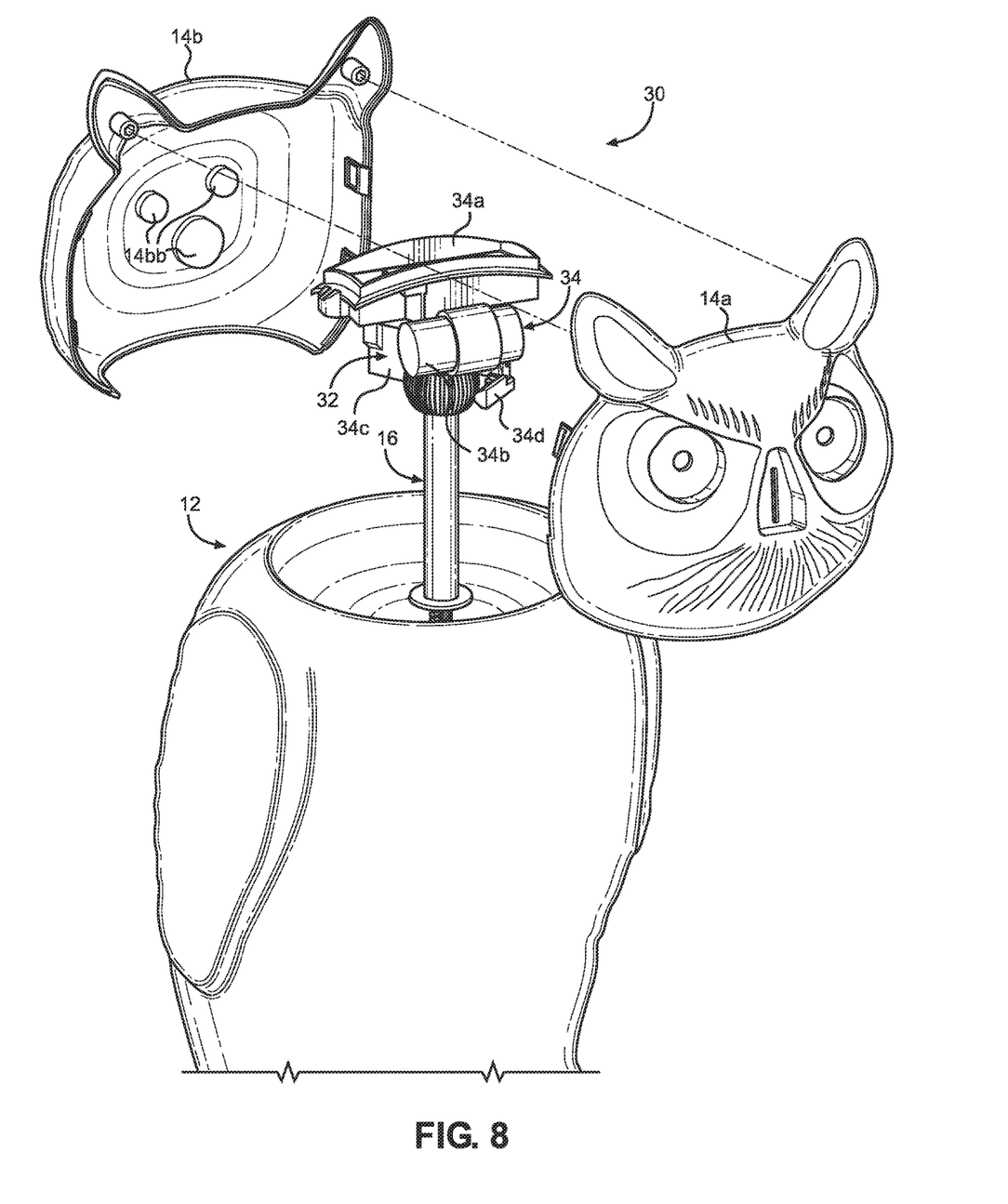
FIG. 8 is an exploded perspective view of an alternative embodiment of a rotating head owl according to the disclosure.
Figure 9:
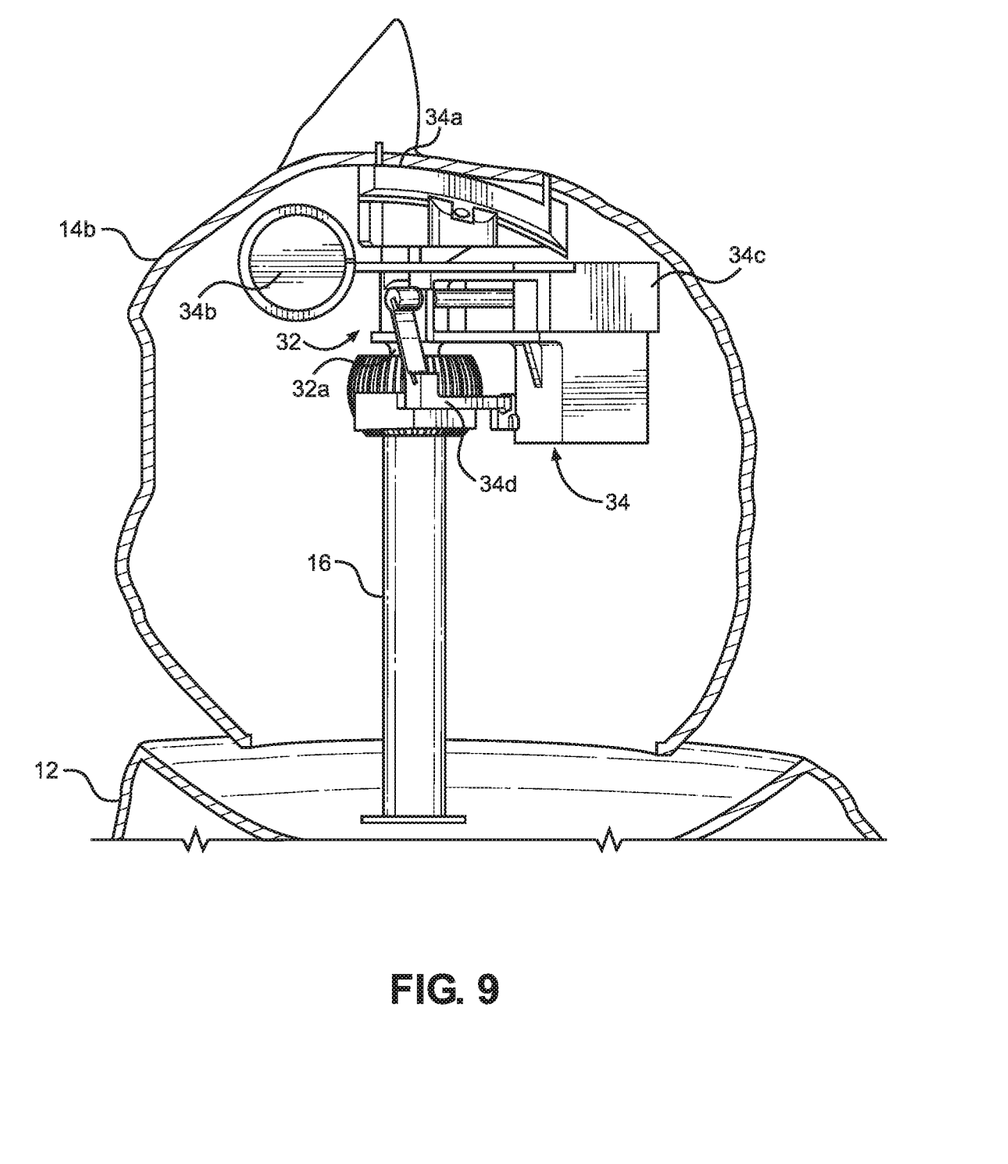
FIG. 9 is a closeup view showing mounting of a head of the owl of FIG. 8 to an unstable mount.

With initial reference to FIGS. 1 and 2, there is shown a scarecrow 10 having a scarecrow body 12 and a balanced head 14 located above the body 12, a lower pivot assembly 16 rigidly connected to the body 12, and an upper pivot assembly 18 rigidly connected to the head 14 and balanced onto the lower pivot assembly 18. FIGS. 3-7 show the lower pivot assembly 16 and the upper pivot assembly.

The scarecrow 10 shown in FIGS. 1 and 2 is non-motorized. Another embodiment of a motorized scarecrow is shown in FIGS. 8-11. The scarecrow 10 is configured as a great-horned owl, but it will be appreciated that the scarecrow may be configured as other birds and other animals.

The body 12 corresponds to the body of the owl replicas described in U.S. Pat. No. 5,901,491, entitled "Owl With Movable Head," issued May 11, 1999, U.S. Pat. No. 7,966,963, entitled "Owl With Intermittent Powered Movement," issued Jun. 28, 2011, and U.S. Pat. No. 8,171, 875, entitled "Owl With Intermittent Powered Movement," issued May 8, 2012, each incorporated by reference herein in its entirety. In this regard, the body 12 externally resembles the shape and appearance of the body of a live owl. The body 12 includes a concave upper surface 12a to receive a lower portion 14c of the head 14 so that the head 14 is countersunk into the body 12 to enhance the realistic appearance of the replica and to avoid diminishment of this appearance during movement of the head 14.

The head 14 is provided by a front face portion 14a and a rear head portion 14b that assemble and matingly engage one another to provide the head 14. The head 14 in the assembled state corresponds externally in shape to the head of a live owl. The assembled head 14 is generally hollow and globe-shaped. The head 14 has an aperture 14d adjacent the lower portion 14c of the head 14.

The heads of the owl structures of the noted U.S. Pat. Nos. 5,901,491; 8,171,875; and 7,966,963 are of one-piece construction. Such heads of one-piece construction have are difficult to balance and to attach to pivot components, requiring considerable time and skill. For example, attempts to balance a one-piece head typically involves trial and error placement of metal weights using adhesive or the like. Also, connection of the head to the pivot components is also difficult, as the only access is through the relatively small opening at the bottom of the one-piece head. The heads are also difficult to uniformly mold and require substantial post-molding labor, such as the removal of excess plastic in addition to balancing and installation problems as noted.

A key aspect of the scarecrow 10 resides in the configuration of the head 14 with a two-piece head, namely, the front face portion 14a and the rear head portion 14b, with the two-pieces of the head configured so that the assembled head is substantially balanced as molded and assembled without the need for adding on weights. This avoids cumbersome and time-consuming balancing associated with prior one-piece heads. Also, the two-piece head 14 is much easier to install on the pivot components. For example, as shown in FIGS. 1 and 2, the rear head portion 14b is installed onto the upper pivot assembly 18 and then the front face portion 14b may be press-fit onto the rear head portion 14b which greatly simplifies installation of the upper pivot assembly 18 onto the head 14.

A plastic mouth or beak 20a and plastic eyes 20b are installed into corresponding receivers 14e and 14f, respectively, formed on the front face portion 14a. The front face portion 14a advantageously provides a structure that has a flattened profile and this profile facilitates automated insertion of the beak 20a and eyes 20b. The automated insertion of beak 20a and eyes 20b is difficult with a one-piece head and is generally done by hand. It will be appreciated that the beak and the eyes may be formed with the front face portion 14a during molding, but, the realistic appearance of separately molded mouths/beaks and eyes is generally better.

The front face portion 14a and the rear head portion 14b have cooperating connectors 22 that matingly engage one another in press-fit relationships to facilitate tool-less assembly of the head 14. One advantage of the two-piece molded head design includes a significant reduction in the labor needed to remove excess plastic around head after molding.

The rear head portion 14b is larger and heavier than the front face portion 14a and the weight of each is adjusted in the molds so that the resulting assembled head 14 having the beak 20a and eyes 20b is substantially balanced upon molding and assembly. The portions 14a and 14b are unequal which is advantageous to facilitate automated removal from their molds. The thickness of the front face portion 14a is generally uniform, with a preferred thickness of about 0.060 inches.

The rear head portion 14b has a uniform thickness, except it is molded to include thickened areas 14bb preferably on the interior of the rear head portion 14b to add additional weight to these areas of the rear head portion 14b. The thickened areas 14bb are desirably located to be across from the locations of the beak 20a and the eyes 20b that are added to the assembled head 14. The weights of the thickened areas 14bb are selected to correspond to the weights of the beak 20a and the eyes 20b to enable the head 14 to be substantially balanced when assembled and placed on the body 12 using the pivot assemblies 16 and 18.

The two-piece head 14 as described is advantageously configured so that the head 14 is substantially balanced as molded and assembled without the need for adding weights or the like after assembly. This avoids cumbersome and time-consuming balancing associated with prior one-piece heads. Also, the two-piece head 14 is much easier to install because the rear head portion 14b is easily installed onto the upper pivot assembly 18 and then the front face portion 14b may be press-fit onto the rear head portion 14b. As will be appreciated, this is much simpler than trying to install a pivot component onto a one-piece head blindly through a hole at the bottom of the head. Furthermore, it provides for reliable desired mounting of the head 14 onto the upper pivot assembly 18 at a desired location of the rear head portion 14b. This consistent positioning of the upper pivot assembly 18 also serves to facilitate balancing of the head 14 in a manufacturing process versus the variances experienced with one-piece heads.

The lower pivot assembly 16 and the upper pivot assembly 18 cooperate to provide an unstable mount suitable to movably mount the head 14 to the body 12 so that the head 14 is freely movable in a rotational, back-and-forth, and side-to-side relationship relative to the body 12. Movement of the head 14 relative to the body 12 may be generated as by slight air movement to cause circular rotational movement of the head 14, in addition to nodding and/or rocking movement of the head 14 to imitate head movements of a live owl to provide a deterrent effect on garden pests of the type commonly preyed upon by owls.

The improved balance of the head 14 achieved by the described two-piece construction of the head 14 and simplified installation has been observed to provide improvements in movement of the head 14. That is, the better balance of the head 14 enables disruption of the resting stability of the head 14 to be achieved by very slight air movement, resulting in enhanced movement of the head 14.

The lower pivot assembly 16 and the upper pivot assembly 18 are also improved over pivot assemblies of the noted U.S. Pat. Nos. 5,901,491; 8,171,875; and 7,966,963.

In particular, the lower pivot assembly 16 is configured to be of plastic construction and to press-fit together and to press-fit install to the body 12 of the scarecrow 10. This eliminates substantial time and skill in assembling the scarecrow 10, as well as substantially reducing component costs.

With additional reference to FIGS. 3-7, the lower pivot assembly 16 is of two-piece molded plastic construction and includes a foot 16a and an upper member 16b that press-fit together, with the foot 16a configured to press-fit install into the body 12.

The foot 16a is of molded one-piece construction and includes a lower barbed end 16c and an upper ribbed end 16d, with a washer or stop 16e centrally located between the lower barbed end 16c and the upper ribbed end 16d. The lower barbed end 16c is configured to be press-fit into a bore or aperture of a top portion of the body 12, with the barbs providing a tight fit and inhibiting removal. The stop 16e abuts the top portion of the body 12 and limits further passage of the foot 16a through the aperture of the top portion of the body 12. The upper ribbed end 16d of the foot 16a is configured to be press-fit into the upper member 16b to fixedly assemble the foot 16a to the upper member 16b.

The upper member 16b is of one-piece construction and includes a cylindrical body 16f having a lower open end 16g that includes ribs 16h configured to frictionally engage with the upper ribbed end 16d of the foot 16a to fixedly install the foot 16a onto the upper member 16b in a press-fit relationship. A cup 16i is formed at the upper end of the cylindrical body 16f. The cup 16i may include flexion slots 16j to facilitate assembly with the upper pivot assembly 18. The exterior surface of the cup 16i is shown with a rugous exterior surface. The rugous surface is desired for use with the motorized scarecrow is shown in FIGS. 8-11, but is not needed for the non-motorized embodiment of FIGS. 1-2. However, for the sake of a single part for both, the rugous surface may be included as shown. A needle 16k is provided to extend vertically from the center of the cup 16i to cooperate with the upper pivot assembly 18. The needle 16k may be plastic and molded as part of the cup 16i, or may be a separate piece, such as a metal needle press-fit into a bore or other receiver of the cup 16i With continuing reference to FIGS. 3-7, the upper pivot assembly 18 is of molded plastic construction and includes an elongate pivot member 18a having an interior pivot surface 18b located at the lower end of the pivot member 18a (FIG. 2) and positionable in contact with the upper end of the needle 16k so that the upper pivot assembly 18 is pivotally and movably seated onto the lower pivot assembly 16.

A washer or stop 18c is formed to surround the lower end of the pivot member 18a and sized to be snap-fit into the cup 16i of the lower pivot assembly 16. The flexion slots 16j of the cup 16i enable the upper end of the cup 16i to expand to receive the stop 18c. The upper end of the cup 16i is sized to retain the 18c from passing back out of the cup 16i unless a removal force is applied. Thus, the washer 18c and the cup 16i cooperate to maintain the upper pivot assembly 18 movably and pivotally seated onto the lower pivot assembly 16.

A head 18d is formed on the uppermost end of the pivot member 18a for mounting the rear head portion 14b to the upper pivot assembly 18. The head 18d includes a mount 18e that fits into a corresponding depression 14g or other receiver formed on the interior of the rear head portion 14b. If desired, adhesive or the like may be added to secure the mount 18e to the depression 14g. The mount 18e and the depression 14e provide repeatable attachment locations to provide convenient and consistent mounting of the head 14 to the upper pivot assembly 18 that aids in providing a balanced head mount during manufacture.

Turning now to FIGS. 8-11, there is shown another embodiment of a motorized scarecrow 30. The scarecrow 30 includes the body 12, the head 14 and the lower pivot assembly 16 substantially as described for the scarecrow 10. However, instead of the described upper pivot assembly 18, the scarecrow 30 includes a motorized upper pivot assembly 32 and an electromechanical assembly 34.

The electromechanical assembly 34 enables intermittent electrically powered movement of the head 14 relative to the body 12 and does not interfere with any free movement of the head 14 provided by the lower pivot assembly 16 and the upper pivot assembly 32. The upper pivot assembly 32 and the electromechanical assembly 34 may be provided by the upper pivot assembly 18 and the electromechanical assembly 20 described in the noted U.S. Pat. Nos. 8,171,875 and 7,966,963.

The upper pivot assembly 32 operates in a manner similar to that of the upper pivot assembly and similarly includes a pivot member 32a having a pivot surface located at the lower end of the pivot member 32a and positionable in contact with the upper end of the needle 16k so that the upper pivot assembly 32 is pivotally and movably seated onto the lower pivot assembly 16. An upper end of the pivot member 32a connects to a solar cell located in a solar cell housing 34a associated with the electromechanical assembly 34, which fixedly connects to the rear head portion 14b. In this regard, it will be appreciated that the rear head portion 14b is configured to be mounted on the solar cell housing 34a.

Figure 10:
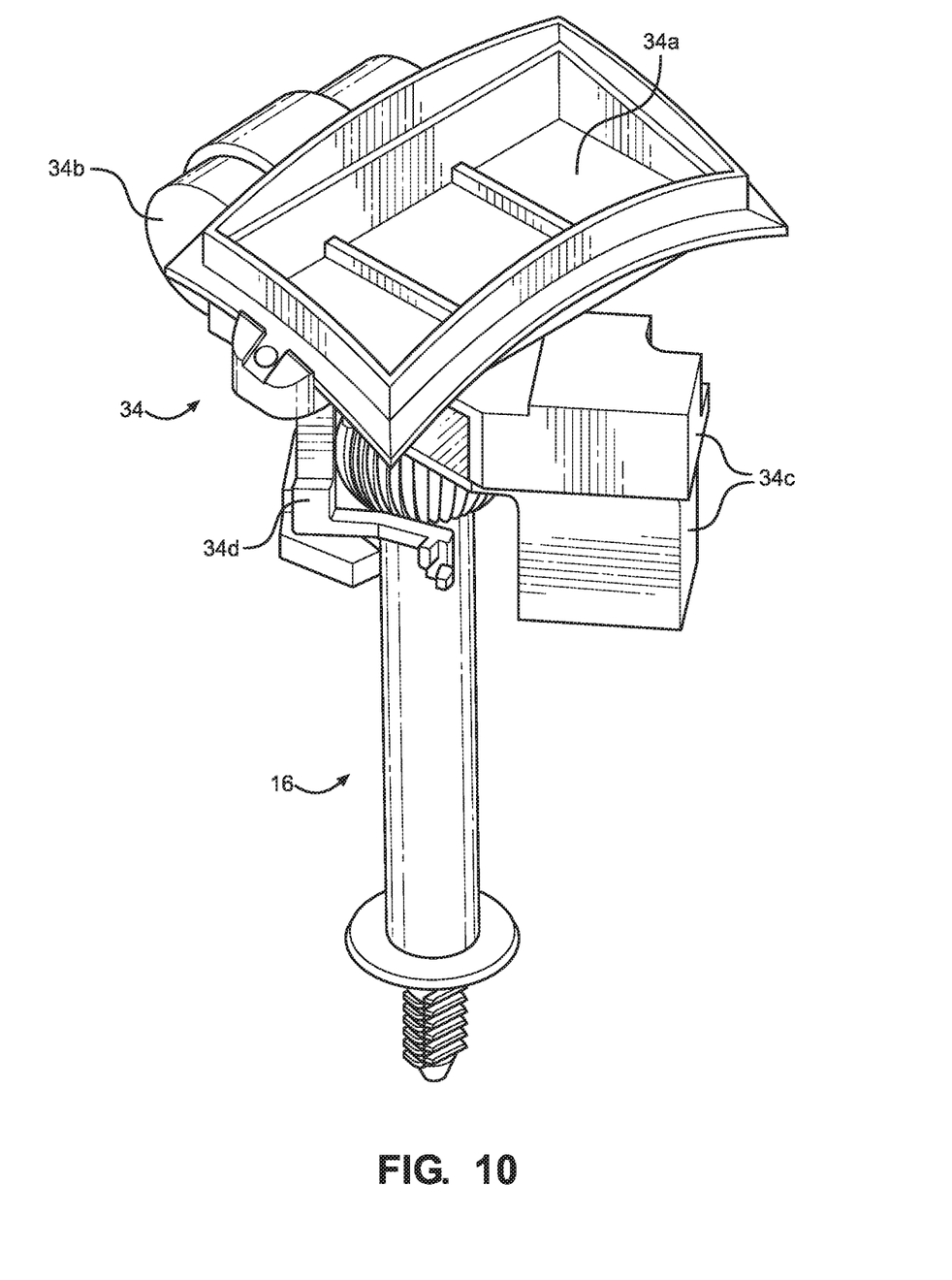
FIGS. 10-11 are assembled views of an unstable mount and associated structure that enables electrically powered movement of the head of the owl of FIG. 8.
Figure 11:
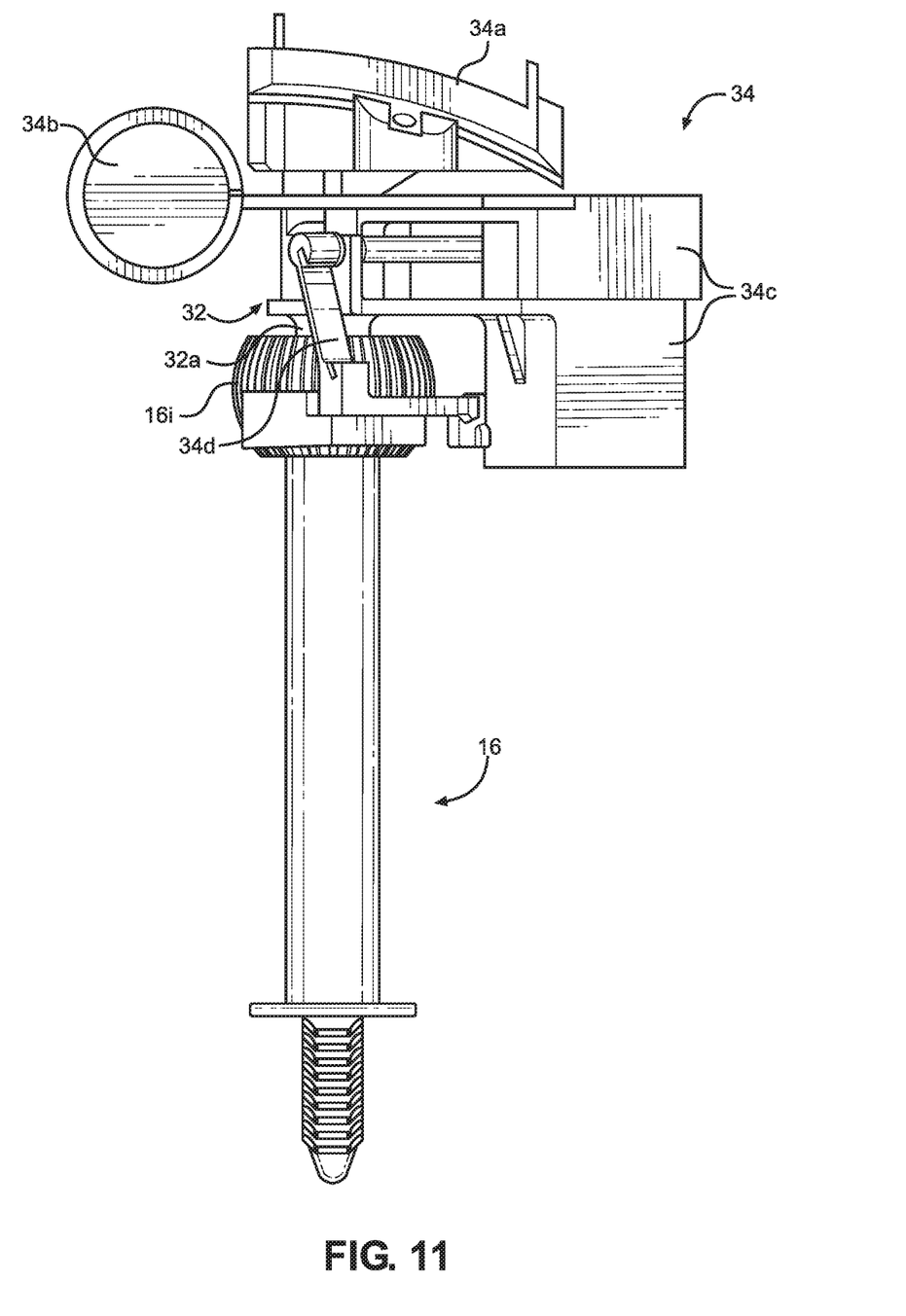

The electromechanical system 34 includes as major components an electrical power source, provided as by the solar cell in the housing 34a, an electrical power storage device, provided as by a capacitor 34b, an electronic actuator, provided as by a solenoid 34c controlled by a timer circuit located on a printed circuit board, and a kicker 34d connected to the solenoid 34c. The circuit board may be of any design suitable for providing a desired function of the kicker, and preferably corresponds to the circuit board shown and described in the noted U.S. Pat. Nos. 8,171,875 and 7,966,963, incorporated herein by reference in their entireties.

The solar cell located in the housing 34a and the capacitor 34b as controlled by the timer circuit enables intermittent or periodic operation of the solenoid 34c. The kicker 34d is connected to the solenoid 34c and activation of the solenoid results in movement of the kicker 34d. The kicker 34d is located and configured when moved to strike the spherical sidewall of the cup 16i of the lower assembly 16 to impart motion to the head 14.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A scarecrow, comprising:
   a scarecrow body; and
   an assembled and balanced hollow scarecrow head of molded plastic construction, the assembled and balanced head comprising a front portion and a rear portion fixed together to form the head, the front portion having a first thickness and the rear portion having a second thickness, the front portion and the rear portion being unequal in weight, with the rear portion having selected areas on an interior surface thereof that are thicker than the first thickness and define an offset weight; and an unstable mount disposed between the body and the head onto which the head is rotatably mounted for 360-degree movement of the head to the body without interfering with free movement of the head, the head being balanced on the unstable mount.

2. The scarecrow of claim 1, wherein the rear portion and the front portion are press-fit together.

3. The scarecrow of claim 1, wherein the unstable mount comprises a lower pivot assembly rigidly connected to the body and an upper pivot assembly rigidly connected to the head and balanced onto the lower pivot assembly.

4. The scarecrow of claim 3, wherein the lower pivot assembly is of two-piece molded plastic construction and includes a foot and an upper member that press-fit together, with the foot configured to press-fit install into the body.

5. The scarecrow of claim 1, wherein the head is globe shaped having a bottom opening for passage of the unstable mount.

6. The scarecrow of claim 1, wherein the rear portion has a rounded profile and the front portion of the head has a flattened profile.

7. The scarecrow of claim 1, further comprising an electromechanical assembly operatively associated with the unstable mount and including a powered kicker to intermittently contact the unstable mount to cause movement of the head relative to the body.

8. A scarecrow, comprising:
a scarecrow body; and
an assembled and balanced hollow head of molded plastic construction, the assembled and balanced head comprising a first portion connected to a second portion, the first portion having a first thickness and the second portion having a second thickness, the first portion and the second portion being unequal in weight, with the second portion having selected areas on an interior surface thereof that are thicker than the first thickness and define an offset weight so that the assembled head is substantially balanced as assembled; and an unstable mount disposed between the body and the head onto which the head is rotatably mounted for 360-degree movement of the head to the body without interfering with free movement of the head, the head being balanced on the unstable mount.

9. The scarecrow of claim 8, wherein the head is globe shaped having a bottom opening for passage of the unstable mount.

10. The scarecrow of claim 8, wherein the second portion has a rounded profile and the first portion of the head has a flattened profile.

11. The scarecrow of claim 8, wherein the second portion and the first portion are press-fit together.

12. The scarecrow of claim 8, wherein the unstable mount comprises a lower pivot assembly rigidly connected to the body and an upper pivot assembly rigidly connected to the head and balanced onto the lower pivot assembly.

13. The scarecrow of claim 8, wherein the lower pivot assembly is of two-piece molded plastic construction and includes a foot and an upper member that press-fit together, with the foot configured to press-fit install into the body.

14. The scarecrow of claim 8, further comprising an electromechanical assembly operatively associated with the unstable mount and including a powered kicker to intermittently contact the unstable mount to cause movement of the head relative to the body.

15. A method of assembling a scarecrow, comprising the steps of:
providing a scarecrow body;
providing a first portion and a second portion of a scarecrow head, the first portion and the second portion being unequal in weight;
providing an unstable mount comprising a lower pivot assembly and an upper pivot assembly;
installing the lower pivot assembly onto the scarecrow body;
installing the upper pivot assembly onto the second portion;
fitting together the first portion and the second portion to provide an assembled scarecrow head that is substantially balanced as assembled, with the upper pivot assembly extending out of a lower portion of the assembled scarecrow head; and
installing the upper pivot assembly with the assembled scarecrow head onto the lower pivot assembly, wherein the scarecrow head is balanced on the unstable mount.

* * * * *